(12) United States Patent
Spletzer et al.

(10) Patent No.: US 8,708,361 B1
(45) Date of Patent: Apr. 29, 2014

(54) BICYCLE OUTRIGGER SUPPORT ASSEMBLY

(76) Inventors: Barry Spletzer, Albuquerque, NM (US); Richard E. Fate, Albuquerque, NM (US)

( * ) Notice: Subject to any disclaimer, the term of this patent is extended or adjusted under 35 U.S.C. 154(b) by 165 days.

(21) Appl. No.: 13/134,693

(22) Filed: Jun. 14, 2011

(51) Int. Cl.
*B62H 1/12* (2006.01)

(52) U.S. Cl.
CPC ........................................ *B62H 1/12* (2013.01)
USPC .......................................................... 280/303

(58) Field of Classification Search
USPC .......... 280/293, 298, 299, 300, 301, 302, 303
See application file for complete search history.

(56) References Cited

U.S. PATENT DOCUMENTS

| | | | |
|---|---|---|---|
| 478,770 A * | 7/1892 | Thorp | 280/301 |
| 502,298 A * | 8/1893 | Hyams | 280/302 |
| 531,016 A * | 12/1894 | Bissell | 280/303 |
| 584,332 A * | 6/1897 | Davis | 280/300 |
| 1,371,736 A * | 3/1921 | Christian | 280/303 |
| 2,561,268 A * | 7/1951 | Dyksma | 280/301 |
| 3,427,037 A * | 2/1969 | Marasco | 280/1.189 |
| 5,607,171 A * | 3/1997 | Labranche | 280/288.1 |
| 2004/0245744 A1* | 12/2004 | Emang et al. | 280/281.1 |

* cited by examiner

*Primary Examiner* — Paul N Dickson
*Assistant Examiner* — Wesley Potter

(57) ABSTRACT

An outrigger support assembly is for use with a frame of a bicycle. Front and rear wheels are coupled to the frame. Handle bars are coupled to and extend upwardly from the frame. Pedals are secured to and extend laterally from the frame adjacent to the forward end of the frame. A drive chain operatively couples the pedals and the rear wheel. A seat is mounted on the frame between the front and rear wheels. The support assembly includes two outrigger wheels positionable on opposite sides of the frame and on opposite sides of the front and rear wheels. Support structures on each side of the frame, each have an interior end couplable to the frame and an exterior end with an outrigger wheel rotatably supported on an associated exterior end. Hinges on each support structure move between lowered and raised orientations.

3 Claims, 4 Drawing Sheets

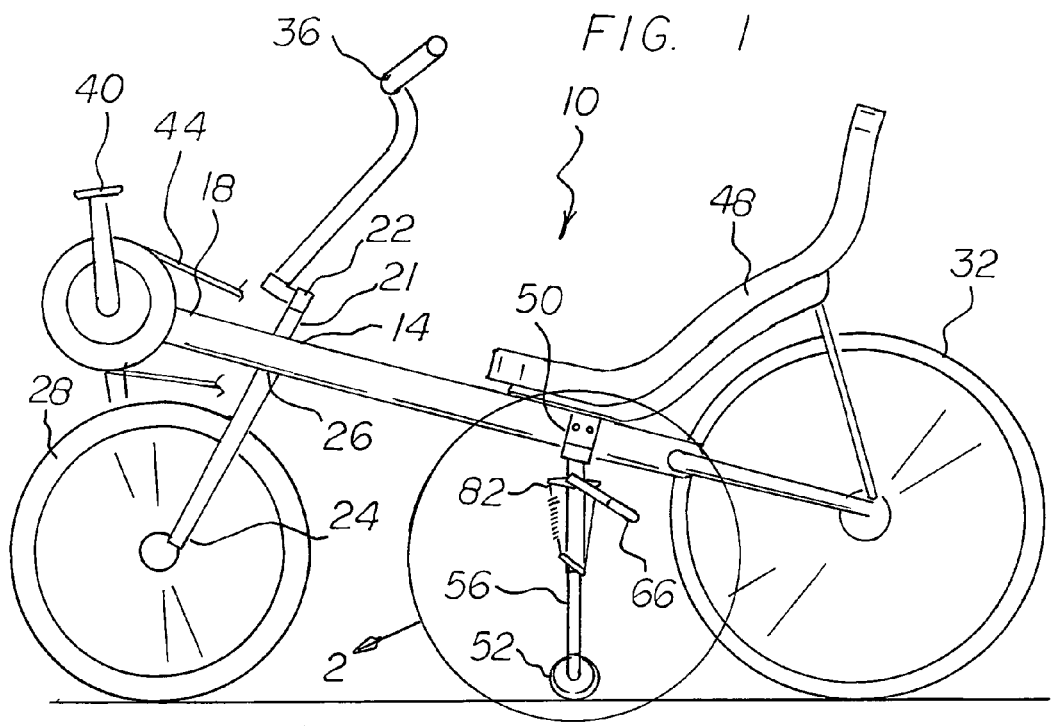
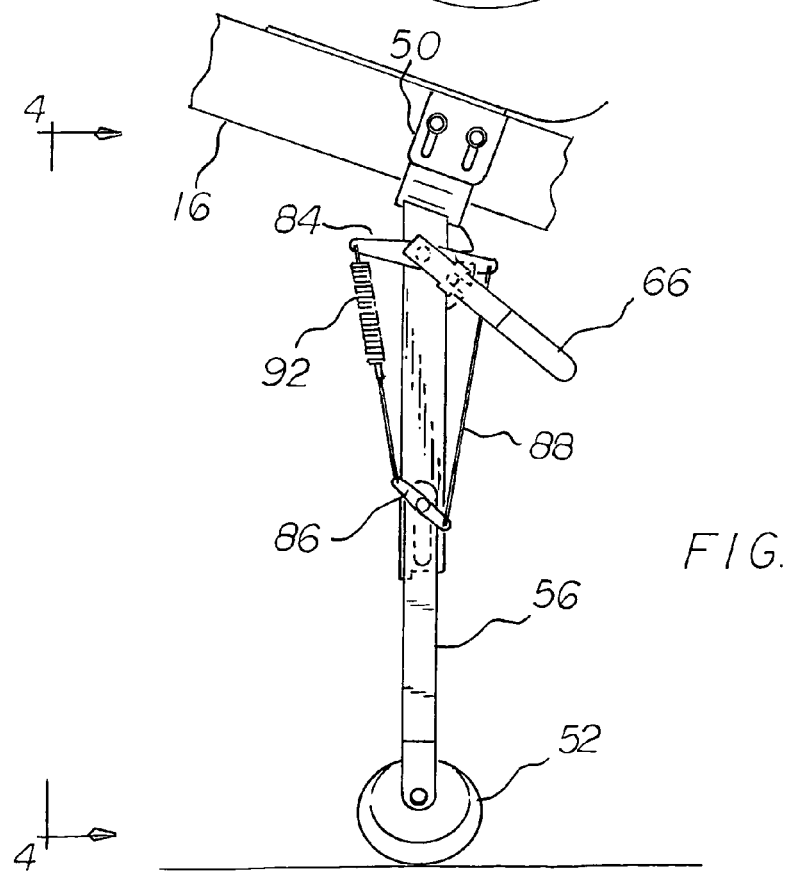

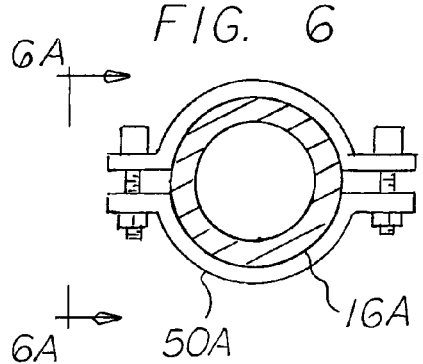
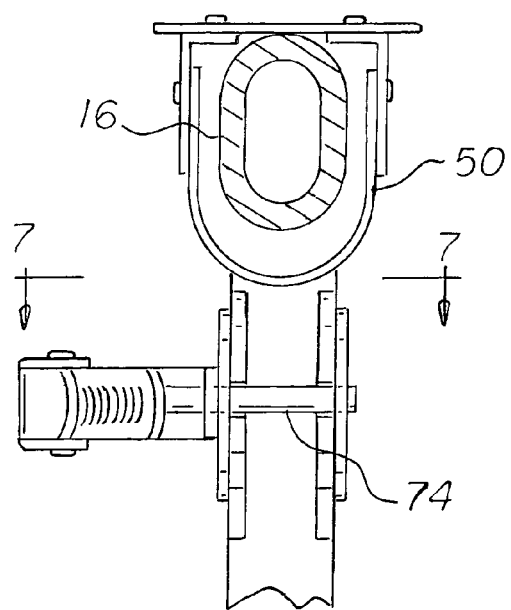
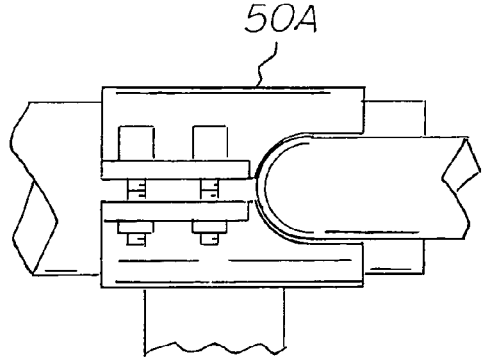
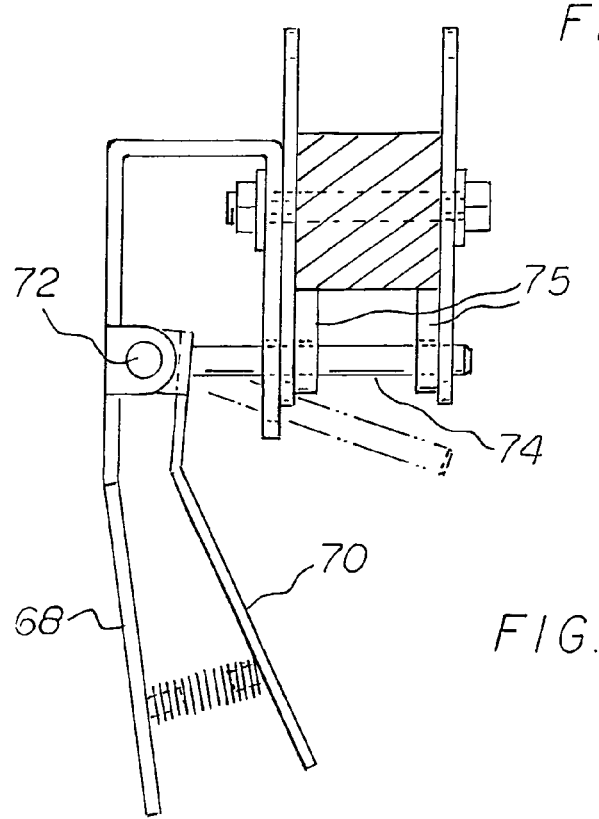

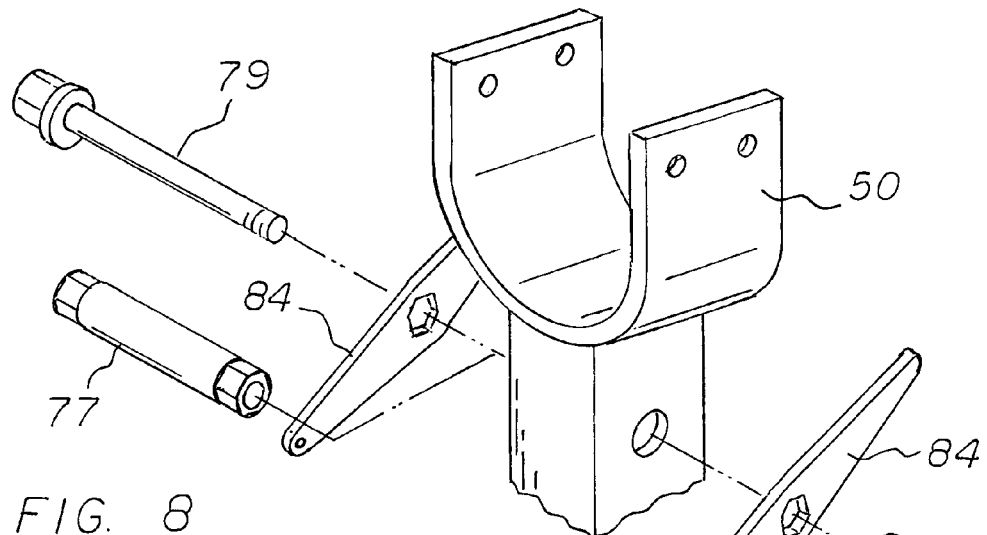
FIG. 8
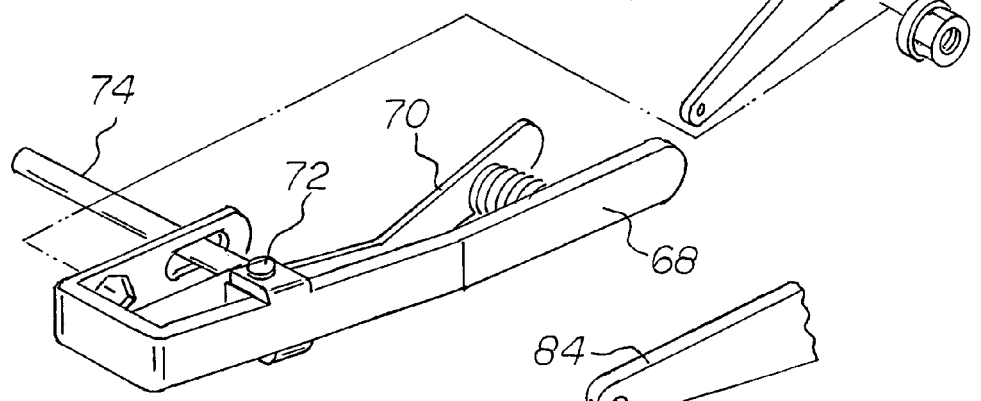
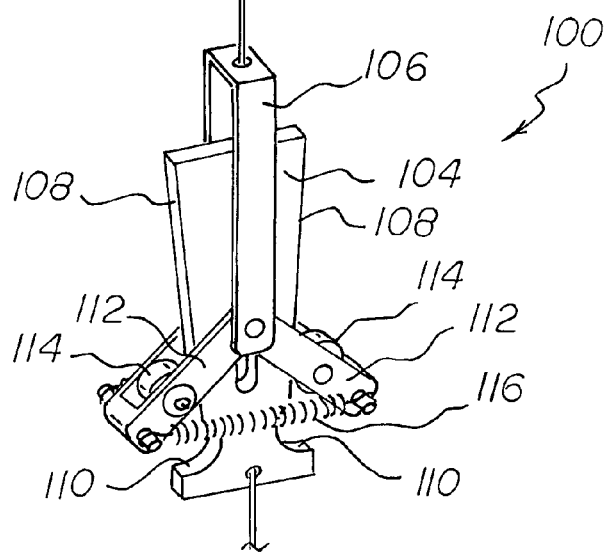
FIG. 9

BICYCLE OUTRIGGER SUPPORT ASSEMBLY

BACKGROUND OF THE INVENTION

Field of the Invention

The present invention relates to a bicycle outrigger support assembly and more particularly pertains to providing selectively retractable rearward outrigger wheels on a recumbent bicycle and for elevating the outrigger rear wheels upon accidentally striking an obstacle, the providing and the elevating being achieved in a safe, reliable, convenient and economical manner.

SUMMARY OF THE INVENTION

In view of the disadvantages inherent in the known types of bicycle support systems of known designs and configurations now present in the prior art, the present invention provides an improved bicycle outrigger support assembly. As such, the general purpose of the present invention, which will be described subsequently in greater detail, is to provide a new and improved bicycle outrigger support assembly which has all the advantages of the prior art and none of the disadvantages.

To attain this, the present invention essentially comprises a bicycle outrigger support assembly. The support assembly is adapted for use with a bicycle of the having a frame. The frame has a central tube. The central tube is in a generally horizontal orientation. The central tube has a forward end. The central tube also has a rearward end. The frame has a generally vertically oriented frame clevis. The frame clevis has an upper extent. The frame clevis has a lower extent. The frame clevis has a central extent. A front wheel is provided. The front wheel is supported at the lower extent of the clevis for rotation about a horizontal axis. The clevis has a central extent. The central extent is supported by the tube adjacent to the forward end for rotation about a generally vertical axis. The frame has laterally spaced brackets. The brackets depend from the central tube adjacent to the rearward end. A rear wheel is provided. The rear wheel is supported at the lower end of the brackets for rotation about a horizontal axis.

Handle bars are provided. The handle bars are secured to and extend upwardly from the upper extent of the clevis. The handle bars are adapted to be held by a user and rotated to change the direction of the movement of the system.

Pedals are provided. The pedals are secured to and extend laterally from the tube adjacent to the forward end of the tube. The pedals are mounted for rotational movement about a horizontal axis parallel with the axes of the front and rear wheels.

Provided next is a drive chain. The drive chain operatively couples the pedals and the rear wheel. In this manner rotation of the pedals causes rotation of the rear wheel.

A seat is provided next. The seat is mounted on the tube between the rear wheel rearwardly and the clevis and the front wheel forwardly. The seat is adapted to receive and support a rider in a generally supine position with hands on the handle bars and with feet on the pedals. In this manner forces to drive the system are provided.

For use with a bicycle of the type described above, the bicycle outrigger support assembly is provided. The assembly includes two outrigger wheels. The outrigger wheels are positionable on opposite sides of the frame and rear wheel. The outrigger wheels each have a diameter between 10 and 25 percent of the diameter of the rear wheel.

Support structures are provided next. One structure is provided on each side of the frame and the rear wheel. Each structure has an interior end. The interior end is coupled to the frame adjacent to the rear wheel. Each structure has an exterior end. An outrigger wheel is rotatably supported on an associated exterior end. Each structure has a hinge. The hinges are adapted to move simultaneously between a lowered orientation and a raised orientation. In the lowered orientation the outrigger wheels are between 0.5 and 2.5 inches from ground. In the raised orientation the outrigger wheels are between 5.0 and 10 inches above ground.

Also provided is a control handle. The control handle is coupled to the tube beneath the seat. The control handle has a fixed component. The control handle also has a pivotable component. The control handle is rotatable about a generally vertical axis upon squeezing together the fixed and pivotable components. A spring tending to separate the fixed and pivotable components is provided. A pivot rod is provided. In this manner the control handle may oscillate about a generally horizontal axis. Further in this manner the control handle raises the outrigger wheels. Also in this manner the control handle may be lowered. Further in this manner the outrigger wheels are lowered. A locking pin is provided. The locking pin is secured to the pivotable component. An arcuate locking plate is provided. The plate has an upper recess. The plate has a lower recess. The locking pin is positionable in the upper recess. In this manner the outrigger wheels are held in the raised orientation. The locking pin is positionable in the lower recess. In this manner the outrigger wheels are held in the lowered orientation. The locking pin is adapted to be withdrawn from the recesses and moved when the fixed and pivotable components are squeezed together.

Further provided is a control assembly. The control assembly is provided on opposite sides of the frame. The control assembly couples the control handle and the outrigger wheels. The control assembly includes upper links. The upper links are pivotable about an upper horizontal axis with the control handle. Concurrent rotation of the two upper links 84 is achieved through sleeve 77 and bolt 79 rotatable in the frame beneath the bracket 50. The control assembly includes lower links. The lower links are pivotable about a lower axis with the support structures. The links have forward extents and rearward extents. Additional links are provided. The additional links have upper ends. The upper ends of the additional links are operatively coupled to the rearward extents of the upper links. The additional links have lower ends. The lower ends of the additional links are operatively coupled to the rearward extents of the lower links. In this manner the control handle is adapted to be manipulated by a rider to move the additional links. In this manner the outrigger wheels are moved between the raised and lowered orientations.

Provided last is an emergency assembly. The emergency assembly is provided on opposite sides of the frame. The emergency assembly includes elastic elements. The elastic elements have upper ends. The upper ends are coupled to the forward ends of the upper links. The elastic elements have lower ends. The lower ends are coupled to the forward ends of the lower links. The emergency assembly is quiescent during normal operations and riding. The emergency assembly is activated during abnormal operations as when an outrigger wheel hits an obstruction to stretch the elastic elements and flex the additional links and raise the outrigger wheels without manipulation of the handle by the user.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bicycle outrigger support assembly which has all of the advantages of the prior art bicycle support systems of known designs and configurations and none of the disadvantages.

It is another object of the present invention to provide a new and improved bicycle outrigger support assembly which may be easily and efficiently manufactured and marketed.

It is further object of the present invention to provide a new and improved bicycle outrigger support assembly which is of durable and reliable constructions.

An even further object of the present invention is to provide a new and improved bicycle outrigger support assembly which is susceptible of a low cost of manufacture with regard to both materials and labor, and which accordingly is then susceptible of low prices of sale to the consuming public, thereby making such bicycle outrigger support assembly economically available to the buying public.

Even still another object of the present invention is to provide a bicycle outrigger support assembly for providing selectively retractable rearward outrigger wheels on a recumbent bicycle and for elevating the outrigger rear wheels upon accidentally striking an obstacle, the providing and the elevating being achieved in a safe, reliable, convenient and economical manner.

Lastly, it is an object of the present invention to provide a new and improved bicycle outrigger support assembly. The support assembly is for use with a frame having forward and rearward ends. Front and rear wheels are coupled to the frame. Handle bars are coupled to and extend upwardly from the frame. Pedals are secured to and extend laterally from adjacent to the forward end of the tube. A drive chain operatively couples the pedals and the rear wheel. A seat is mounted on the frame between the front and rear wheels. For use with the above-described bicycle is a bicycle outrigger support assembly having outrigger wheels adapted to be positioned on opposite sides of the frame and on opposite sides of the front and rear wheels. A support structure is provided on each side of the frame. Each support structure has an interior end coupled to the frame. Each structure has an exterior end with an outrigger wheel. Each outrigger wheel is rotatably supported on an associated exterior end. A hinge is on each support structure, the hinges adapted to move between lowered and raised orientations.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a recumbent bicycle outrigger support assembly constructed in accordance with the principles of the present invention.

FIG. 2 is an enlarged side elevational view of a portion of the system taken at Circle 2 of FIG. 1.

FIG. 5 is a cross sectional view taken along line 5-5 of FIG. 3.

FIG. 6 is a cross sectional view similar to FIG. 5 but illustrating an alternate embodiment of the invention.

FIG. 6A is a side elevational view taken along line 6A-6A of FIG. 6.

FIG. 7 is a plan view of a portion of the system taken along line 7-7 of FIG. 5.

FIG. 8 is an exploded perspective illustration of the control mechanisms shown in the prior Figures.

FIG. 9 is a perspective illustration of a control mechanisms constructed in accordance with an alternate embodiment of the invention.

The same reference numerals refer to the same parts throughout the various Figures including the various embodiments of the invention.

DESCRIPTION OF THE PREFERRED EMBODIMENT

Figure 3:
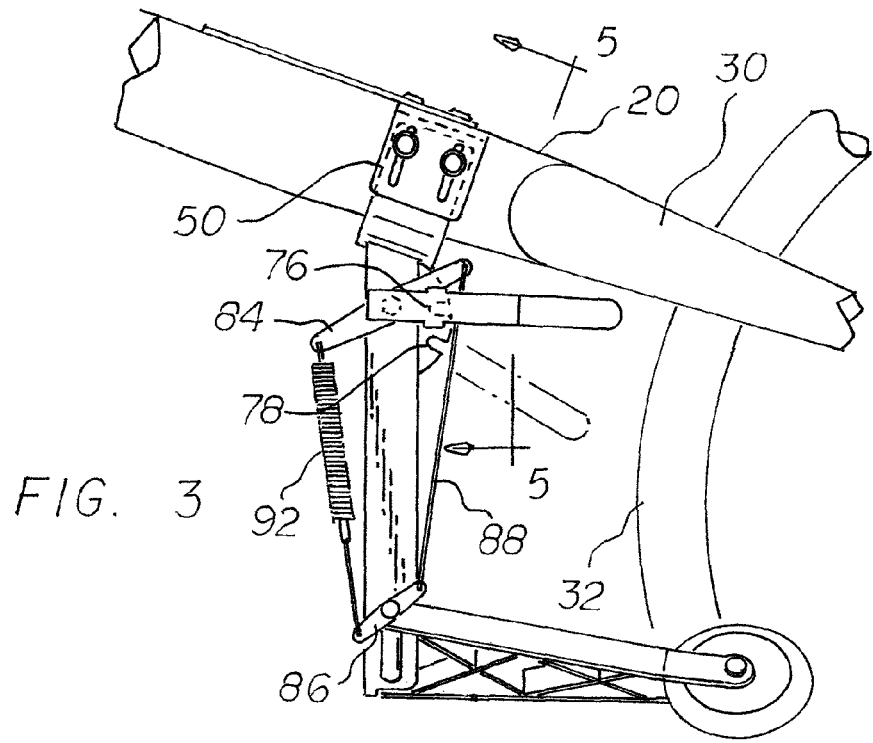
FIG. 3 is a perspective illustration of the components shown in FIG. 2 but in the retracted orientation.
Figure 4:
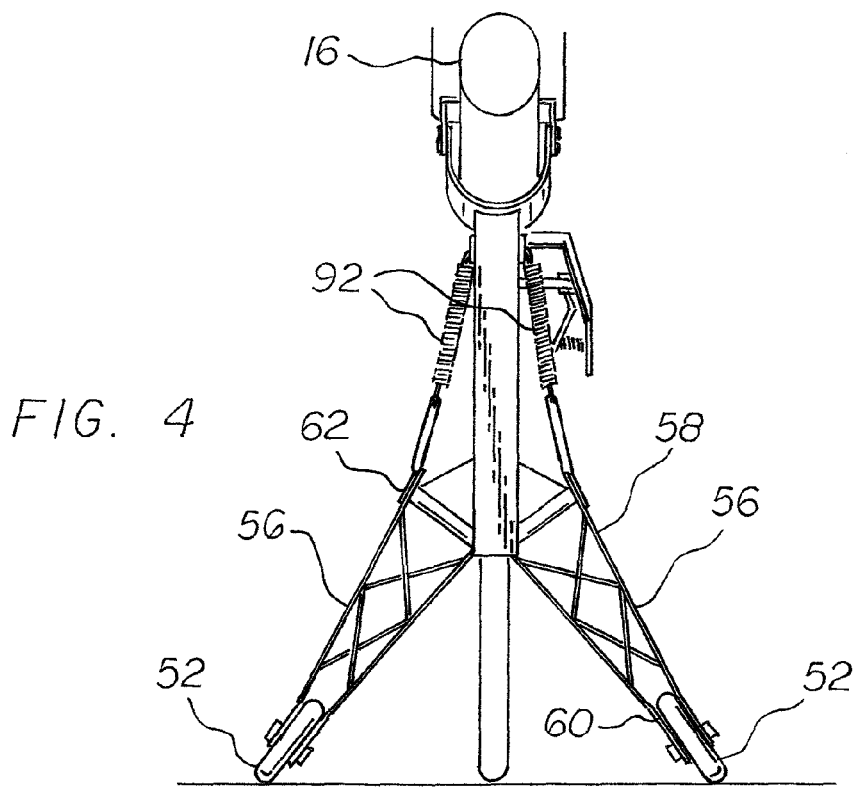
FIG. 4 is a front elevational view of a portion of the system taken along line 4-4 of FIG. 2.

With reference now to the drawings, and in particular to FIG. 1 thereof, the preferred embodiment of the new and improved bicycle outrigger support assembly embodying the principles and concepts of the present invention and generally designated by the reference numeral 10 will be described.

The present invention, the bicycle outrigger support assembly 10, is comprised of a plurality of components. Such components in their broadest context include two outrigger wheels and a support structure. Such components are individually configured and correlated with respect to each other so as to attain the desired objective.

The bicycle support assembly of the present invention is preferably adapted for use with a recumbent bicycle of the type having a frame 14. The frame, in one embodiment, is of the type having a central tube 16. The tube as shown in FIG. 5 is adapted to be fabricated of any of a plurality of rigid light weight materials including, for example, aluminum, and other light weight metals, or of a composite material, note FIG. 6. As shown in FIG. 5, the tube 16 is adapted to be oval in cross section or circular 16A as illustrated in FIG. 6. The central tube is in a generally horizontal orientation. The central tube has a forward end 18. The central tube also has a rearward end 20. The frame has a generally vertically oriented frame clevis 21. The frame clevis has an upper extent 22. The frame clevis has a lower extent 24. The frame clevis has a central extent 26. A front wheel 28 is provided. The front wheel is supported at the lower extent of the clevis for rotation about a horizontal axis. The clevis has a central extent. The central extent is supported by the tube adjacent to the forward end for rotation about a generally vertical axis. The frame has laterally spaced brackets 30. The brackets depend from the central tube adjacent to the rearward end. A rear wheel 32 is provided. The rear wheel is supported at the lower end of the brackets for rotation about a horizontal axis.

Handle bars 36 are provided. The handle bars are secured to and extend upwardly from the upper extent of the clevis. The handle bars are adapted to be held by a user and rotated to change the direction of the movement of the system.

Pedals 40 are provided. The pedals are secured to and extend laterally from the tube adjacent to the forward end of the tube. The pedals are mounted for rotational movement about a horizontal axis parallel with the axes of the front and rear wheels.

Provided next is a drive chain 44. The drive chain operatively couples the pedals and the rear wheel. In this manner rotation of the pedals causes rotation of the rear wheel.

A seat 48 is provided next. The seat is mounted on the tube between the rear wheel rearwardly and the clevis and the front wheel forwardly. The seat is adapted to receive and support a rider in a generally supine position with hands on the handle bars and with feet on the pedals. In this manner forces to drive the system are provided.

The bicycle outrigger support assembly of the present invention is adapted for use with a bicycle of the type as described above. The bicycle outrigger support assembly includes two outrigger wheels 52. The outrigger wheels are positioned on opposite sides of the frame and rear wheel. Securement of the outrigger wheels is through a bracket 50, 50A configured for encompassing a tube. Note FIGS. 5 and 6. The outrigger wheels each have a diameter between 10 and 25 percent of the diameter of the rear wheel.

Support structures 56 are provided next. One structure is provided on each side of the frame and the rear wheel. Each structure has an interior end 58. The interior end is coupled to the frame adjacent to the rear wheel. Each structure has an exterior end 60. An outrigger wheel is rotatably supported on an associated exterior end. Each structure has a hinge 62. The hinges are adapted to move simultaneously between a lowered orientation and a raised orientation. In the lowered orientation the outrigger wheels are between 0.5 and 2.5 inches from ground. In the raised orientation the outrigger wheels are between 5.0 and 10 inches above ground.

Also provided is a control handle 66. The control handle is coupled to the tube beneath the seat. The control handle has a fixed component 68. The control handle also has a pivotable component 70. The control handle is rotatable about a generally vertical axis upon squeezing together the fixed and pivotable components. A spring tending to separate the fixed and pivotable components is provided. A pivot rod 72 is provided. In this manner the control handle may oscillate about a generally horizontal axis. Further in this manner the control handle raises the outrigger wheels. Also in this manner the control handle may be lowered. Further in this manner the outrigger wheels are lowered. A locking pin 74 is provided. The locking pin is secured to the pivotable component. An arcuate locking plate 75 is provided. The plate has an upper recess 76. The plate has a lower recess 78. The locking pin is positionable in the upper recess. In this manner the outrigger wheels are held in the raised orientation. The locking pin is positionable in the lower recess. In this manner the outrigger wheels are held in the lowered orientation. The locking pin is adapted to be withdrawn from the recesses and moved when the fixed and pivotable components are squeezed together.

Further provided is a control assembly 82. The control assembly is provided on opposite sides of the frame. The control assembly couples the control handle and the outrigger wheels. The control assembly includes upper links 84. The upper links are pivotable about an upper horizontal axis with the control handle. Concurrent rotation of the two upper links 84 is achieved through sleeve 77 and bolt 79 rotatable in the frame beneath the bracket 50. In this manner, a single handle translates into movement of two upper links, two lower links, two support structures, two outrigger wheels, two additional links and two springs for an emergency assemblies.

The control assembly includes lower links 86. The lower links are pivotable about a lower axis with the support structures. The links have forward extents and rearward extents. Additional links 88 such as wires are provided. The additional links have upper ends. The upper ends of the additional links are operatively coupled to the rearward extents of the upper links. The additional links have lower ends. The lower ends of the additional links are operatively coupled to the rearward extents of the lower links. In this manner the control handle is adapted to be manipulated by a rider to move the additional links. In this manner the outrigger wheels are moved between the raised and lowered orientations.

Provided last is an emergency assembly. The emergency assembly is provided on opposite sides of the frame. The emergency assembly includes elastic elements 92 such as coil springs. The elastic elements have upper ends. The upper ends are coupled to the forward ends of the upper links. The elastic elements have lower ends. The lower ends are coupled to the forward ends of the lower links. The emergency assembly is quiescent during normal operations and riding. The emergency assembly is activated during abnormal operations as when an outrigger wheel hits an obstruction to stretch the elastic elements and flex the additional links and raise the outrigger wheels without manipulation of the handle by the user.

An alternate embodiment 100 of the present invention is provided. Note FIG. 9. The frame, support structures, wheels and outrigger wheels, as well as the upper links, control handle, lower links and additional links are as in the prior embodiment. As in the prior embodiment, the control handle is adapted to be manipulated by a rider to move the additional link and, in response thereto, to move the outrigger wheels between the raised and lowered orientations.

A modified emergency assembly is next provided. The emergency assembly includes essentially fixed plates 104. The emergency assembly includes inverted U-shaped connectors 106. The connectors are reciprocable with respect to the fixed plates. Upper lines are provided. The upper lines connect the U-shaped connectors to the forward ends of the upper links. Lower lines are provided. The lower lines connect the fixed plates to the forward ends of the lower links. The plates have tapered edges 108. The plates have lower recesses 110. Pivot arms 112 are provided. The pivot arms have upper ends. The upper ends are coupled to the U-shaped connectors. The pivot arms have lower ends. The lower ends have rollers 114. The rollers are rotatable against the edges. Essentially horizontal elastic elements 116 are provided. The elastic elements tend to pull the pivot arms together. The emergency assembly is quiescent during normal operations and riding. The emergency assembly is activated during abnormal operations as when an outrigger wheel hits an obstruction to stretch the elastic elements and flex the additional links and raise the outrigger wheels without manipulation of the handle by the user.

The present invention is primarily directed to a retractable outrigger support assembly for use with a recumbent bicycle. The present invention is also directed to a recumbent bicycle with a retractable outrigger support assembly.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bicycle outrigger support assembly for use with a bicycle of the type having a frame formed with a central tube with forward and rearward ends, front and rear wheels coupled to the frame, handle bars coupled to and extending upwardly from the frame, pedals secured to and extending laterally from the tube adjacent to the forward end of the tube, a drive chain operatively coupling the pedals and the rear wheel, a seat mounted on the tube between the front and rear wheels, the outrigger support assembly comprising:

two outrigger wheels positioned on opposite sides of the frame and the front and rear wheels;

a support structure on each side of the frame, each structure having an interior end coupled to the frame and an exterior end with an outrigger wheel rotatably supported on an associated exterior end;

a hinge on each support structure, the hinges adapted to move simultaneously between a lowered orientation with the outrigger wheels closely spaced from ground and a raised orientation with the outrigger wheels distantly spaced from the ground;

a control handle coupled to the tube beneath the seat, additional links, each additional link having an upper end operatively coupled to the handle and a lower end operatively coupled to the support structure whereby the control handle is adapted to be manipulated to move the additional links and, in response thereto, to move the outrigger wheels between the raised and lowered orientations;

a control assembly including upper links pivotable about an upper horizontal axis with the control handle, the control, assembly including lower links pivotable about a lower axis with the support structures, the upper link having a forward extent and a rearward extent, the lower link having a forward extent and a rearward extent, additional links having upper ends operatively coupled to the rearward extents of the upper links, the additional links having lower ends operatively coupled to the rearward extents of the lower links, whereby the control handle is adapted to be manipulated to move the additional link and, in response thereto, to move the outrigger wheels between the raised and lowered orientations; and an emergency assembly including vertically oriented elastic elements, the elastic elements having upper ends coupled to the forward ends of the upper links, the elastic elements having lower ends coupled to the forward ends of the lower links, the emergency assembly being quiescent during normal operations and riding, the emergency assembly being activated during abnormal operations as when an outrigger wheel hits an obstruction to stretch the elastic elements and flex the additional links and raise the outrigger wheels without manipulation of the handle.

2. A bicycle outrigger support assembly for use with a bicycle of the type having a frame formed with a central tube with forward and rearward ends, front and rear wheels coupled to the frame, handle bars coupled to and extending upwardly from the frame, pedals secured to and extending laterally from the tube adjacent to the forward end of the tube, a drive chain operatively coupling the pedals and the rear wheel, a seat mounted on the tube between the front and rear wheels, the outrigger support assembly comprising:

two outrigger wheels positioned on opposite sides of the frame and the front and rear wheels;

a support structure on each side of the frame, each structure having an interior end coupled to the frame and an exterior end with an outrigger wheel rotatably supported on an associated exterior end;

a hinge on each support structure, the hinges adapted to move simultaneously between a lowered orientation with the outrigger wheels closely spaced from ground and a raised orientation with the outrigger wheels distantly spaced from the ground;

a control handle coupled to the tube beneath the seat, additional links, each additional link having an upper end operatively coupled to the handle and a lower end operatively coupled to the support structure whereby the control handle is adapted to be manipulated to move the additional links and, in response thereto, to move the outrigger wheels between the raised and lowered orientations;

the control assembly including upper links pivotable about an upper horizontal axis with the control handle, lower links pivotable about a lower axis with the support structure, the upper links having forward extents and rearward extents, the lower links having forward extents and rearward extents; the upper ends of the additional links operatively coupled to the rearward extents of the upper links, the lower ends of the additional links operatively coupled to the rearward extents of the lower links, whereby the control handle is adapted to be manipulated to move the additional links and, in response thereto, to move the outrigger wheels between the raised and lowered orientations; and an emergency assembly including essentially fixed plates (104) with inverted U-shaped connectors (106) reciprocable with respect to the fixed plates, upper lines connecting the U-shaped connectors to the forward ends of the upper links, lower lines connecting the fixed plates to the forward ends of the lower links, the plates having tapered edges (108) with lower recesses (110), pivot arms (112) having upper ends coupled to the U-shaped connectors, the pivot arms having lower ends with rollers (114) rotatable against the edges, essentially horizontal elastic elements (116) tending to pull the pivot arms together, the emergency assembly being quiescent during normal operations and riding, the emergency assembly being activated during abnormal operations as when an outrigger wheel hits an obstruction to stretch the elastic elements and flex the additional links and raise the outrigger wheels without manipulation of the handle.

3. A recumbent bicycle outrigger support system (10) for providing selectively retractable rearward outrigger wheels on a recumbent bicycle and for elevating the outrigger rear wheels upon accidentally striking an obstacle, the providing and the elevating being achieved in a safe, reliable, convenient and economical manner, the system comprising, in combination:

a frame (14) including a central tube (16) in a generally horizontal orientation and having a forward end (18) and a rearward end (20), the frame including a generally vertically oriented frame clevis with an upper extent (22) and a lower extent (24) and a central extent (26), a front wheel (28) supported at the lower extent of the clevis for rotation about a horizontal axis, the clevis having a central extent supported by the tube adjacent to the forward end for rotation about a generally vertical axis, the frame including laterally spaced brackets (30) depending from the central tube adjacent to the rearward end, a rear wheel (32) supported at the lower end of the brackets for rotation about a horizontal axis;

handle bars (36) secured to and extending upwardly from the upper extent of the clevis, the handle bars adapted to be held and rotated to change the direction of the movement of the system;

pedals (40) secured to and extending laterally from the tube adjacent to the forward end of the tube, the pedals being mounted for rotational movement about a horizontal axis parallel with the axes of the front and rear wheels;

a drive chain (44) operatively coupling the pedals and the rear wheel whereby rotation of the pedals causes rotation of the rear wheel;

a seat (48) mounted on the tube between the rear wheel rearwardly and the clevis and the front wheel forwardly;

two outrigger wheels (52) positioned on opposite sides of the frame and rear wheel, the outrigger wheels each having a diameter between 10 and 25 percent of the diameter of the rear wheel;

support structures (56) with one structure on each side of the frame and the rear wheel, each structure having an interior end (58) coupled to the frame adjacent to the rear wheel, each structure having an exterior end (60) with an outrigger wheel rotatably supported on an associated exterior end, each structure having a hinge (62), the hinges adapted to move simultaneously between a lowered orientation with the outrigger wheels between 0.5 and 2.5 inches from ground and a raised orientation with the outrigger wheels between 5.0 and 10 inches above ground;

a control handle (66) coupled to the tube beneath the seat, the control handle having a fixed component (68) and a pivotable component (70) rotatable about a generally vertical axis upon squeezing together the fixed and pivotable components, a spring tending to separate the fixed and pivotable components, a pivot rod (72) for oscillating the control handle about a generally horizontal axis for raising the control handle to raise the outrigger wheels and for lowering the control handle to lower the outrigger wheels, a locking pin (74) secured to the pivotable component, an arcuate locking plate (75) with an upper recess (76) and a lower recess (78), the locking pin positionable in the upper recess to hold the outrigger wheels in the raised orientation, the locking pin positionable in the lower recess to hold the outrigger wheels in the lowered orientation, the locking pin adapted to be withdrawn from the recesses and moved when the fixed and pivotable components are squeezed together;

a control assembly (82) on opposite sides of the frame coupling the control handle and the outrigger wheels, the control assembly including upper links (84) pivotable about an upper horizontal axis with the control handle, sleeve (77) and bolt (79) rotatable in the frame beneath the bracket for concurrent rotation of the control handle with the two upper links (84), the control assembly including lower links (86) pivotable about a lower axis with the support structures, the links having forward extents and rearward extents, additional links (88) having upper ends operatively coupled to the rearward extents of the upper links, the additional links having lower ends operatively coupled to the rearward extents of the lower links, whereby the control handle is adapted to move the additional links and, in response thereto, to move the outrigger wheels between the raised and lowered orientations; and an emergency assembly on opposite sides of the frame including elastic elements (92), the elastic elements having upper ends coupled to the forward ends of the upper links, the elastic elements having lower ends coupled to the forward ends of the lower links, the emergency assembly being quiescent during normal operations and riding, the emergency assembly being activated during abnormal operations as when an outrigger wheel hits an obstruction to stretch the elastic elements and flex the additional links and raise the outrigger wheels without manipulation of the handle.

* * * * *